US011335130B2

(12) United States Patent
Povolny et al.

(10) Patent No.: US 11,335,130 B2
(45) Date of Patent: May 17, 2022

(54) METHOD FOR CHECKING TOLL TRANSACTIONS AND COMPONENTS THEREFOR

(71) Applicant: Kapsch TrafficCom AG, Vienna (AT)

(72) Inventors: Robert Povolny, Vienna (AT); Oliver Nagy, Vienna (AT)

(73) Assignee: Kapsch TrafficCom AG, Vienna (AT)

(*) Notice: Subject to any disclaimer, the term of this patent is extended or adjusted under 35 U.S.C. 154(b) by 837 days.

(21) Appl. No.: 16/033,769

(22) Filed: Jul. 12, 2018

(65) Prior Publication Data
US 2018/0336739 A1 Nov. 22, 2018

Related U.S. Application Data (62) Division of application No. 14/491,616, filed on Sep. 19, 2014, now Pat. No. 10,055,899.

(30) Foreign Application Priority Data

Oct. 8, 2013 (EP) ..................................... 13187687

(51) Int. Cl.
*G07B 15/06* (2011.01)
*G06K 9/78* (2006.01)
*H04W 4/80* (2018.01)

(52) U.S. Cl.
CPC .............. *G07B 15/063* (2013.01); *G06K 9/78* (2013.01); *H04W 4/80* (2018.02)

(58) Field of Classification Search
CPC ...................................................... G06Q 10/02
See application file for complete search history.

(56) References Cited

U.S. PATENT DOCUMENTS 2,530,654 A    11/1950   Ellis et al.
5,602,375 A *   2/1997   Sunahara ............. G07B 15/063
                                              235/375

(Continued)

FOREIGN PATENT DOCUMENTS

CN    101692314 A *   4/2010
EP      1708143 A2    10/2006

(Continued)

OTHER PUBLICATIONS

Middleware to Enhance Mobile Communications for Road Safety and Traffic Mobility Applications; Manessah, C. et al.; IET Intell. Transp. Syst., 2010, vol. 4, Iss. 1, pp. 24-36 (Year: 2010).*

(Continued)

*Primary Examiner* — Emmett K. Walsh
(74) *Attorney, Agent, or Firm* — Fiala & Weaver P.L.L.C.

(57) ABSTRACT

The subject matter disclosed herein relates to a method for checking toll transactions, produced from position notifications of a mobile phone connected via a mobile network to a transaction server, with the aid of a network of distributed toll beacons, which can communicate via short-range radio with on-board units of passing vehicles and are connected to the transaction server. To this end, a interoperable multifunctional OBU is created that is formed from a GNSS- and NFC-enabled mobile phone on the one hand and an NFC- and DSRC-enabled OBU on the other hand, which exchange data concerning a session identifier (SID) via their common NFC interface, which session identifier forms a link between the infrastructureless and the infrastructure-bound billing functions of the multi-functional OBU. The disclosed subject matter also relates to a toll beacon and a transaction server for same.

16 Claims, 4 Drawing Sheets

(56) References Cited

U.S. PATENT DOCUMENTS

| | | | |
|---|---|---|---|
| 2003/0011494 A1 | 1/2003 | Reider et al. | |
| 2008/0204278 A1 | 8/2008 | Tsuzuki et al. | |
| 2008/0316042 A1* | 12/2008 | Scales | H04W 24/00 340/686.1 |
| 2009/0024458 A1* | 1/2009 | Palmer | G07B 15/02 705/13 |
| 2010/0076878 A1* | 3/2010 | Burr | G08G 1/20 705/34 |
| 2010/0287038 A1* | 11/2010 | Copejans | G07B 15/063 705/13 |
| 2012/0246477 A1* | 9/2012 | Hafenscher | H04L 9/3242 713/168 |
| 2013/0018705 A1* | 1/2013 | Heath | G08G 1/14 705/13 |
| 2014/0188579 A1* | 7/2014 | Regan, III | G07B 15/06 705/13 |
| 2015/0088617 A1 | 3/2015 | Borras et al. | |
| 2015/0100394 A1 | 4/2015 | Povolny et al. | |

FOREIGN PATENT DOCUMENTS

| | | |
|---|---|---|
| EP | 2500869 A1 | 9/2012 |
| EP | 2530654 A1 | 12/2012 |
| EP | 2538363 A1 | 12/2012 |
| EP | 2541502 A1 | 1/2013 |

OTHER PUBLICATIONS

"Office Action received for European Patent Application No. 13187687.2," dated Jun. 22, 2015, 4 pages.

"Non-Final Office Action received for U.S. Appl. No. 14/491,616," dated Aug. 24, 2017, 4 pages.

Manasseh, et al., "Middleware To Enhance Mobile Communications For Road Safety And Traffic Mobility Applications", IET Intell. Transp. Syst., vol. 4, No. 1, 2010, pp. 24-36.

"Extended European Search Report Received for EP Patent Application No. 13187687.2," dated Apr. 10, 2014, 4 pages.

* cited by examiner

METHOD FOR CHECKING TOLL TRANSACTIONS AND COMPONENTS THEREFOR

CROSS-REFERENCE TO RELATED APPLICATION(S)

The present application is a divisional application of U.S. application Ser. No. 14/491,616, filed on Sep. 19, 2014 and entitled "METHOD FOR CHECKING TOLL TRANSACTIONS AND COMPONENTS THEREFORE," which claims priority to European Patent Application No. 13 187 687.2, filed on Oct. 8, 2013, the entirety of each of which is incorporated by reference herein.

BACKGROUND

Technical Field

The present subject matter relates to a method for checking toll transactions and also to a vehicle-based arrangement, a toll beacon and a transaction server for same.

Background Art

In the future European electronic toll system (EETS), vehicle-based on-board units (OBUs) are to be interoperable both with "infrastructure-bound" and "infrastructureless" road toll systems. Infrastructure-bound road toll systems are based on a network of geographically distributed toll beacons, which communicate via short-range radio with OBUs of passing vehicles in order to localise these to the respective beacon location and thus charge for location use. Infrastructureless road toll systems are based on satellite-assisted "self-locating" OBUs, which transmit the position notifications and/or toll transactions via a mobile network to a central station. An EETS-compatible OBU therefore has to have both a short-range transceiver, for example in accordance with the DSRC (dedicated short range communication), CEN-DSRC, UNI-DSRC, IEEE 802.11p or WAVE (wireless access for vehicular environments) or ITS-G5 standards, for communication with the toll beacons of the infrastructure-bound road toll system as well as a satellite navigation receiver and a mobile communications module for communication with the mobile network of the infrastructureless road toll system. Such a multi-functional OBU is therefore constructed in an extremely complex manner and also requires comprehensive testing and certifications so that it meets the accuracy and security requirements of the respective road toll system in order to prevent toll calculation errors and toll fraud.

BRIEF SUMMARY

One object of the disclosed subject matter is to create a multi-functional OBU for interoperable road toll systems, which is of simpler construction and requires lower testing and certification outlay compared with the known systems without undermining the billing and fraud security of the system as a whole. A further object of the disclosed subject matter is to create a method for checking toll transactions of such multi-functional OBUs as well as toll beacons and transaction servers suitable for same.

In a first aspect the disclosed subject matter thus creates a method for checking toll transactions, generated from position notifications of a mobile phone connected via a mobile network to a transaction server, with the aid of a network of distributed toll beacons, which communicate via short-range radio with on-board units of passing vehicles and are connected to the transaction server, comprising:

carrying a mobile phone and an on-board unit on a vehicle;

generating a session identifier, exchanging the session identifier between mobile phone and the on-board unit and transmitting the session identifier to the transaction server;

producing position notifications in the mobile phone and sending the position notifications under the session identifier to the transaction server in order to produce toll transactions;

when the on-board unit passes a toll beacon, logging the pass in a beacon log under the session identifier; and double-checking the toll transactions produced for the session identifier with the beacon log created for the session identifier.

In accordance with the disclosed subject matter, an interoperable multi-functional OBU is formed from a GNSS (global navigation satellite system)-enabled mobile phone on the one hand and a DSRC (dedicated short range communication)-enabled OBU on the other hand, which exchange data via a common interface. A unique identifier in the road toll system (at least temporarily), that is to say the session identifier, can be exchanged via this interface and forms a link between the infrastructureless billing functions of the multi-functional OBU on the one hand and the infrastructure-bound billing functions of the multi-functional OBU on the other hand. The highly secure and highly accurate position data of toll beacons of an infrastructure-bound road toll system which encounter a multi-functional OBU during the journey thereof, said OBU operating in GNSS or infrastuctureless mode, can thus be used with the aid of the checking method to check the GNSS-based toll transactions, such that billing errors and fraud attempts, to which an infrastructureless road toll system is exposed, can be recognised and punished. The disclosed subject matter therefore creates an interoperable road toll system with high billing and fraud security on the basis of few, cost-effective components with low certification outlay.

In accordance with a first variant, when a toll beacon is passed a beacon identifier is transmitted from the toll beacon to the on-board unit and is stored in a first beacon log in the on-board unit, and the first beacon log is transmitted with the session identifier via the mobile phone to the transaction server in order to be double-checked. The beacon log used to double-check the GNSS-based position notifications is thus collected by each multi-functional OBU itself during the journey thereof, which requires only little change to the existing toll beacon network.

In a second variant, which can be executed alternatively or additionally to the first variant, as a toll beacon is passed the session identifier is transmitted from the on-board unit to the toll beacon and from there is transmitted with a beacon identifier to the transaction server, and all beacon identifiers received under the session identifier are stored in a second beacon log. Here, the toll beacon network collects the passes of a multi-functional OBU past a beacon under a certain session identifier, which relieves the OBU part of the multi-functional OBU, such that OBUs that are more cost-effective and have lower computing power are sufficient.

In a third variant, in which both a first beacon log is collected in a multi-functional OBU and a second beacon log is collected by the toll beacons, the second beacon log may additionally also be double-checked against the first beacon log during the double check. This introduces a further security stage into the system, since not only can either the beacon passes collected by the multi-functional OBUs during the journey thereof in the form of the first beacon logs or the OBU passes collected by the toll beacons in the form of the second beacon logs be used for checking, but both beacon logs, more specifically both for mutual checking and for the checking of the GNSS-based position notifications.

A further embodiment of the method comprises the following features:

when passing the toll beacon: recording a vehicle feature using a detector of the toll beacon and storing the vehicle feature under the session identifier in the toll beacon; and when the double check in the transaction server indicates a mismatch, transmitting the stored vehicle feature from the toll beacon to the transaction server.

The toll beacons passed by a multi-functional OBU in GNSS mode can thus also be used simultaneously for enforcement. In contrast to known DSRC solutions, a vehicle feature is recorded by way of precaution each time a multi-functional OBU passes a beacon; if the subsequent double check in the transaction server reveals that a calculation error, toll offence or fraud attempt has occurred in the GNSS-based toll mode, the vehicle feature recorded at the corresponding toll beacon can be used for enforcement because it proves that this beacon was passed.

The detector may, for example, be a camera and the vehicle feature may, for example, be a feature of an external appearance of the vehicle, and therefore an image of the vehicle or of the number plate thereof can be used as enforcement proof, for example.

In order to ensure protection of the personal data of the vehicle user, such as number plate or whereabouts of the vehicle, the recorded vehicle features or images may, for example, be encrypted with the aid of the session identifier in order to prevent improper use. If a toll transaction is checked and found to be correct, the session identifier can be deleted in the transaction server and a decryption of stored, encrypted vehicle features or images is thus no longer possible.

Toll transactions may, for example, be double-checked in the transaction server by means of map matching between geographical positions of toll beacons, which are stored in the beacon log on the basis of the beacon identifiers thereof, and the position notifications. The geographical positions of the toll beacons are known beforehand highly accurately, and therefore they can be used as reference for the geographic checking of the position data transmitted in the position notifications of a multi-functional OBU in GNSS mode.

A commercially conventional near-range radio communication standard, such as WLAN, WiFi®, Bluetooth®, RFID (radio frequency identification), or NFC (near field communication), may, for example, be used for the interface in the multi-functional OBU between mobile phone and on-board unit. NFC-enabled mobile phones are becoming increasingly widespread. The advantage of NFC is the extremely short range thereof, which requires a direct swipe of the mobile phone relative to the on-board unit in order to establish a temporary NFC connection. By swiping the mobile phone via the on-board unit, the session identifier can thus be generated, and the start of sessions in the mobile phone and the on-board unit is thus initiated; a second swiping terminates these sessions and transmits the first beacon log from the on-board unit via the mobile phone to the transaction server.

The first beacon log may, for example, be encrypted cryptographically in the on-board unit and is transmitted in this form to the mobile phone. Applications in the mobile phone can thus be prevented from reading or even manipulating the beacon log as said log is transmitted to the transaction server.

With at least one of the aforementioned steps of transmitting the session identifier, an on-board unit identifier may optionally also be transmitted in each case. The transaction server can thus additionally perform an assignment between session identifier and on-board unit identifier, which facilitates enforcement.

In a second aspect the disclosed subject matter creates a multi-functional OBU in the form of a vehicle-based arrangement for the presented method, comprising:

a mobile phone with a satellite receiver for position determination and a mobile communications module for position notification via a mobile network to a transaction server; and an on-board unit with a short-range transceiver for radio communication with a toll beacon, wherein the mobile phone and the on-board unit are configured to exchange a session identifier via a common radio interface, which session identifier is used by the mobile phone in a position notification via the mobile network and is used by the on-board unit in a radio communication with a toll beacon.

In a third aspect the disclosed subject matter creates a toll beacon which is particularly suitable for carrying out the method presented here and which comprises a short-range transceiver for radio communication with a passing on-board unit of a vehicle, an interface to a transaction server, and a processor with memory for controlling the transceiver and the interface, wherein the processor is configured to receive a session identifier from a passing on-board unit and to transmit this together with a beacon identifier to the transaction server.

Lastly, the present subject matter creates, in a fourth aspect, a transaction server for the specified method, comprising a first interface to a mobile network and a second interface to a network of geographically distributed toll beacons, wherein the transaction server is configured to double-check position notifications of a mobile phone received via the first interface with beacon logs received via the first interface and/or the second interface, wherein toll beacons passed by the mobile phone are specified in said beacon logs.

BRIEF DESCRIPTION OF THE DRAWINGS/FIGURES

Further features and advantages of the method, the multi-functional OBU, the toll beacon and the transaction server of the disclosed subject matter will now be described in greater detail on the basis of exemplary embodiments with reference to the accompanying drawings. In the figures.

DETAILED DESCRIPTION

Figure 1:
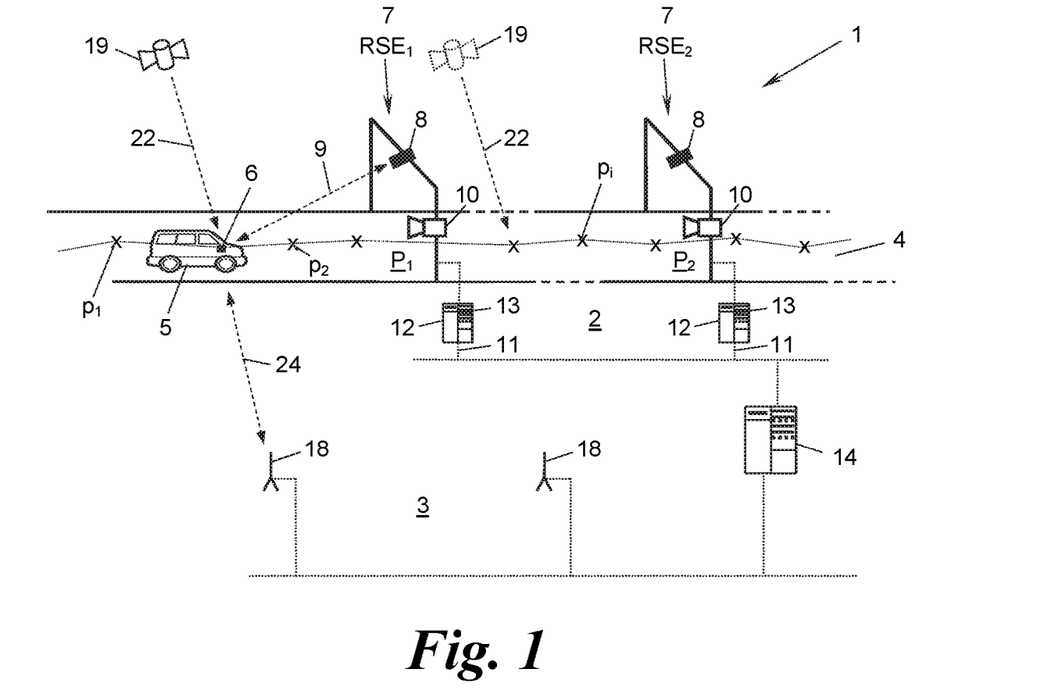
FIG. 1 shows a schematic overview of a road toll system with components according to an embodiment.

FIG. 1 shows, in compressed form, a road toll system 1, which consists of an infrastructure-bound part 2 and an infrastructureless part 3. By way of example, a vehicle 5 is moving on a road 4 in the road toll system 1 and carries an interoperable multi-functional on-board unit (multi-functional or MF OBU 6, that is to say an OBU operable with both parts 2, 3), also referred to here as a "vehicle-based arrangement".

The infrastructure-bound part 2 of the road toll system 1 comprises a multiplicity of toll beacons (roadside entities) 7 or $RSE_1$, $RSE_2$, . . ., generally $RSE_n$, which are distributed over the network of roads 4 and which each have a short-range transceiver 8 for radio communication 9 with an MF OBU 6 passing the beacon 7, a detector 10 for recording a feature of the vehicle 5 carrying the MF OBU 6, for example a camera for recording a vehicle image, and also an interface 11, which components 8, 10, 11 are all controlled by a local processor 12 with memory 13. The beacons 7 are connected via the interfaces 11 to a central transaction server (or a number of central transaction servers) 14 of the road toll system 1.

Due to the limited range of the radio link 9, a vehicle 5, more specifically the MF OBU 6 thereof, can be localised as it passes a beacon 7 or $RSE_n$ to the respective known location $P_n$ of the beacon, and from this a toll transaction TR recording or billing the location use can be produced for the transaction server 14, whether produced directly in the toll beacon 7 and transmitted to the transaction server via the interface 11 or whether only produced in the transaction server 14 on the basis of the data received from the toll beacon 7.

The transceiver 8 and therefore the radio link 9 have a radio range of at most a few metres, a few tens of metres or a few hundred metres, as is implemented for example by the DSRC (dedicated short range communication), CEN-DSRC, UNI-DSRC, IEEE 802.11p or WAVE (wireless access for vehicular environments) or ITS-G5 standards inclusive of WLAN and Wifi®, Bluetooth® or also active and passive RFID (radio frequency identification) technologies. All of these standards are combined here for the sake of simplicity under the term "DSRC", and part 2 of the road toll system 1 is accordingly also referred to as the DSRC part 2.

Figure 2:
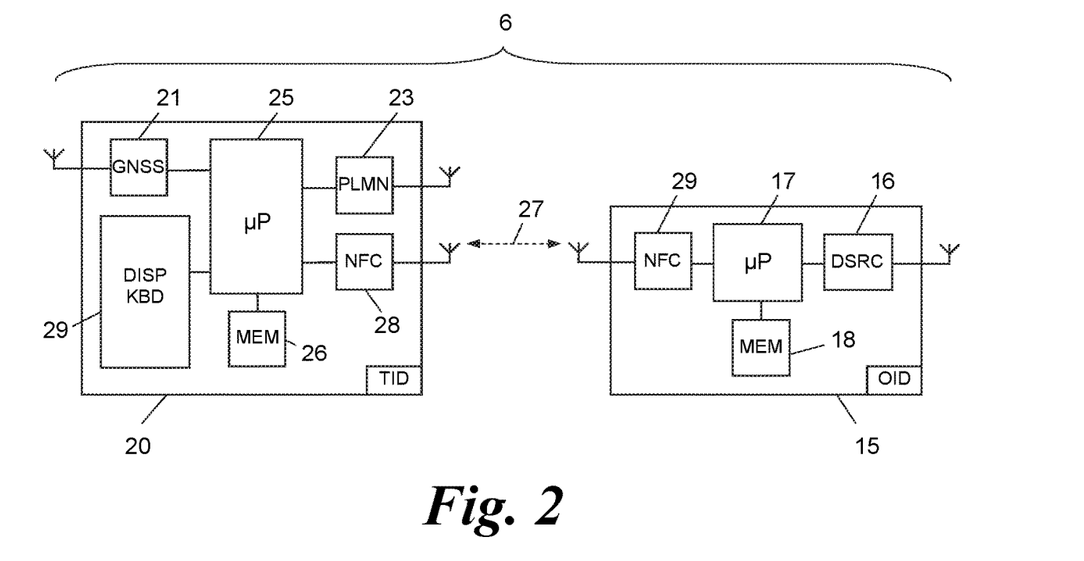
FIG. 2 shows a block diagram of a vehicle-based arrangement ("multi-functional OBU") of the road toll system of FIG. 1.

For cooperation with the DSRC part 2, the MF OBU 6 according to FIG. 2 comprises a DSRC part 15 (also referred to as "DSRC OBU" or "OBU" for short) with a short-range transceiver 16 for establishing the radio link 9 and a processor 17 controlling this and having a memory 18. In the DSRC part 2 of the road toll system 1, each MF OBU 6 is identified by an OBU identifier OID of the OBU 15, and each toll beacon 7 or $RSE_n$ is identified by a beacon identifier $BID_n$.

The infrastructureless part 3 of the road toll system 1, as indicated by the name, does not have a dedicated road-side infrastructure, but instead uses an existing mobile network 18 (of which just some base stations are shown by way of representation) and also an existing network of navigation satellites 19 (some shown by way of example). The mobile network 18 (public land mobile network, PLMN) can be of any type known in the field, for example a 3G, 4G or 5G mobile network according to the GSM, UMTS or LTE standards, etc. The satellite network 19 may be any known GNSS (global navigation satellite system), for example a GPS, GLONASS or GALILEO network. The part 3 of the road network 1 is also referred to as the GNSS part 3 for the sake of simplicity.

For cooperation with the GNSS part 3 of the road toll system 1, the MF OBU 6 has a GNSS part 20, which comprises a satellite receiver 21 for receiving 22 position signals of the satellite network 19, a mobile communications module 23 for communication 24 in the mobile network 18, and a processor 25, which controls the components 21, 23 and has a memory 26. With the aid of the satellite receiver 21, the geographical position of the vehicle 5 or of the MF OBU 6 is determined continuously, and from this position data ("position fixes") $p_1$, $p_2$, . . . , generally $p_i$, are produced and are transmitted as position notifications $pos_1$, $pos_2$, . . . , generally $pos_i$, to the transaction server 14 via the mobile communications module 23 and the mobile network 18. The transaction server 14 can thus produce toll transactions TR from the obtained position notifications $pos_i$, which toll transactions record or bill the location uses of the vehicle 5. Alternatively, "finished" toll transactions TR are already produced in the MF OBU 6 by the processor 25 from the position data $p_i$ and are transmitted in the form of the position notifications $pos_i$ to the transaction server 14, that is to say the position notifications $pos_i$ may contain both "raw" position data $p_i$ and "finished" toll transactions TR that have already been processed.

According to FIG. 2, the MF OBU 6 is not constructed from a single hardware component part for the purposes discussed in the introduction, but instead an arrangement is composed of two separate components embodying the GNSS part 20 on the one hand and the DSRC part 15 on the other hand, which can communicate with one another temporarily via an interface 27.

The interface 27 for example is a short-range radio interface according to the standards discussed above for the DSRC interface 9, such as WLAN, WiFi®, Bluetooth® or RFID. The interface 27, however, may, for example, be a near-range radio interface of extremely short radio range, in particular according to the NFC standard (near-field communication). Such an NFC interface 27 is configured exclusively for the near range, that is to say is limited to a few centimetres or a few tens of centimetres, and therefore the components 20 and 15 of the MF OBU 6 have to be brought into the direct vicinity of one another in order to establish a temporary NFC connection 27 during this period of approach. Such an "approaching" is established for example by a "swiping" of the GNSS part 20 over the DSRC part 15 for the short period of the swiping.

For this purpose, the components 20, 15 each comprise a short-range communication module 28, 29, for example an NFC communication module. Here, it is possible for one of the modules 28, 29 to be formed as a reader or requester and for the other module to be formed as a transponder or responder, for example the module 28 is formed as an RFID reader and the module 29 is formed as an RFID transponder ("tag") or vice versa. All of these variants are summarised here under the terms "NFC connection" and "NFC module". The NFC modules 28, 29 are controlled in the components 20, 15 by the respective processor 25 or 17 respectively.

The GNSS part 20 of the MF OBU 6 can be provided for example by an accordingly programmed and NFC-, RFID- or Bluetooth-enabled mobile phone. The term "mobile phone" here includes any type of communication device that can communicated in the mobile network 18 and is additionally equipped with a short-range communication module 28, for example a wireless phone, Smartphone, Notebook PC or tablet PC, personal digital assistant (PDA), etc. Such a mobile phone generally also has a display and input device 29 for the user, for example a screen with keypad or a touchscreen. The DSRC part 15 of the MF OBU 6 can in turn be formed by a "conventional" OBU for a DSRC road toll system, which is additionally equipped with a short-range communication module 29.

FIGS. 3 to 6 show a method for checking toll transactions in the road toll system 1 with use of the components shown in FIGS. 1 and 2. The sequence diagram of FIG. 3 has been divided between FIGS. 3a and 3b due to its size. FIG. 3b shows the continuation of FIG. 3a.

Figure 3A:
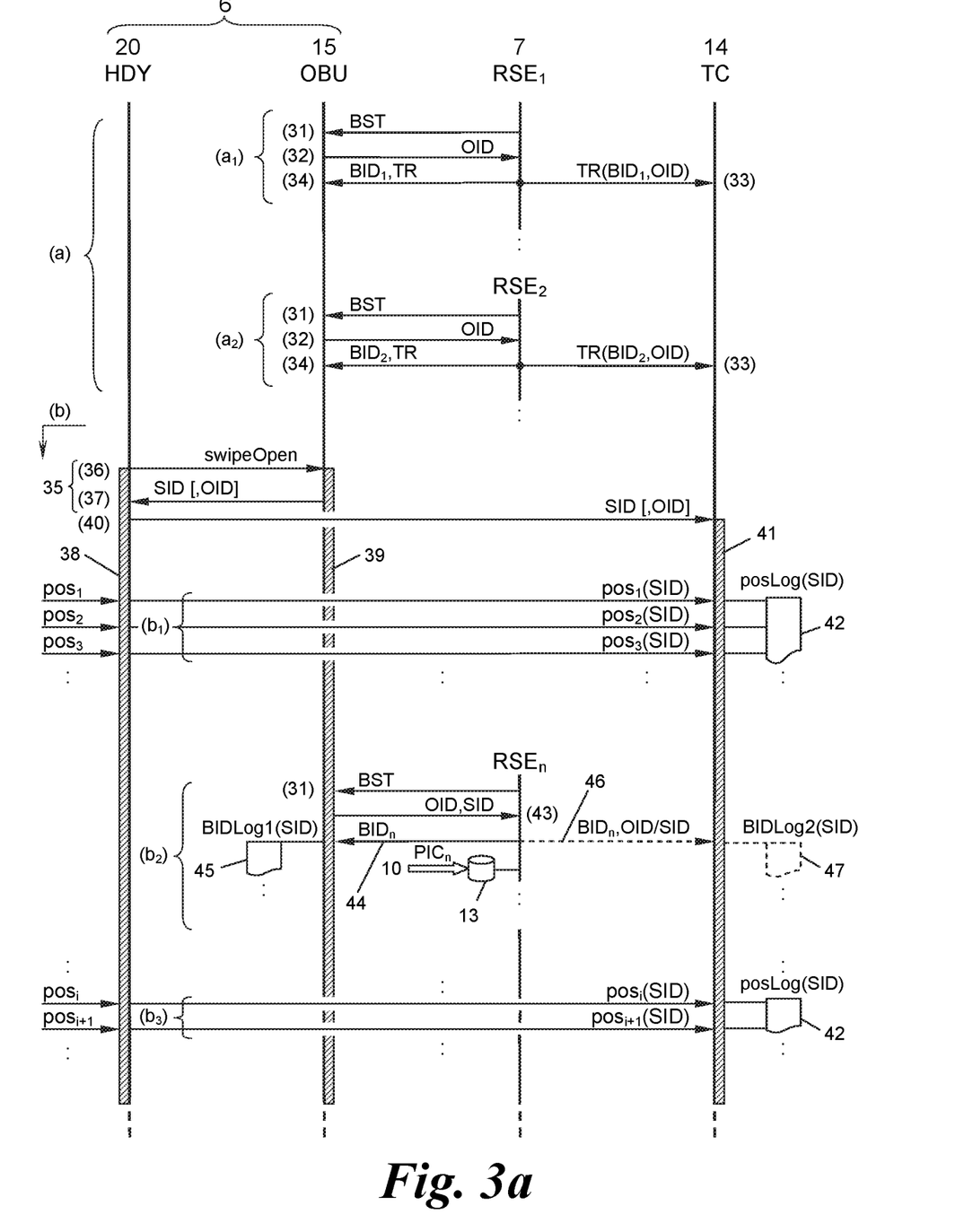
FIGS. 3a and 3b show a method in the form of a sequence diagram in accordance to an embodiment.

Portion (a) of FIG. 3a shows a phase of the method in which an MF OBU 6 first cooperates (in the manner of a conventional DSRC OBU) exclusively with the DSRC part 2 of the road toll system 1. By way of example, two DSRC transactions $a_1$, $a_2$ are illustrated with different toll beacons 7 or $RSE_1$, $RSE_2$ over the journey of the vehicle 5. With each DSRC transaction $a_1$, $a_2$, a toll beacon 7 asks the MF OBU 6, more specifically the DSRC part 15 thereof, to respond via the radio interface 9, for example with the DSRC message "BST" (beacons service table) 31. The MF OBU 6 then responds, in one or more radio communications 9, with the OBU identifier OID thereof (step 32, illustrated in simplified form), whereupon the toll beacon 7 produces a beacon transaction TR and (immediately or later) transmits this under the beacon identifier $BID_n$ thereof to the transaction server 14 (step 33). The toll beacon 7 may optionally return the beacon identifier $BID_n$ thereof and/or the toll transaction TR to the MF OBU 6 (step 34).

Portion (b) of FIG. 3 shows a phase of the method in which the MF OBU 6 acts as a GNSS OBU in the GNSS part 3 of the road toll system 1, wherein it is controlled or double-checked however by the DSRC part 2 of the road toll system 1. To this end, at the GNSS part 20 (also referred to hereinafter as "mobile phone" (HDY)), the user initiates a first temporary NFC connection 35 via the radio interface 27 to the DSRC part 15 of the MF OBU 6, for example by swiping the mobile phone 20 over the OBU 15 (step 36). The swiping 36 prompts the generation of a unique session identifier ("session ID") SID in the road toll system 1, for example a very large random number, of which the occurrence again in the road toll system 1 is extremely unlikely. The session identifier SID can be generated in the mobile phone 20 and transmitted via the NFC interface 27 to the OBU 15, or can be generated in the OBU 15 and transmitted via the NFC interface 27 to the mobile phone 20; in any case the session identifier SID is exchanged between the mobile phone 20 and OBU 15 (step 37). The OBU 15 may also optionally transmit the OBU identifier OID thereof to the mobile phone 20.

A session 38 and 39 are now started both in the mobile phone 20 and in the OBU 15 respectively under the session identifier SID. In step 40, the mobile phone 20 transmits the session identifier SID (optionally also the OBU identifier OID if obtained) via the mobile network 18 to the transaction server 14, which then also opens a session 41 under the session identifier SID.

The further exemplary phases $b_1$, $b_3$ and $b_5$ in FIG. 3 now show billing phases in which the MF OBU 6 functions as a GNSS OBU and deposits position notifications $pos_i$, generated with the aid of the satellite receiver 21 thereof, at the transaction server 14 via the mobile network 18. Here, the position data $pos_i$ are sent in each case together with the session identifier SID to the transaction server 14, and therefore all of these received position data $pos_i$ can be assigned to the session identifier SID and can be stored in a position data log posLog(SID) 42 (see also FIG. 4). The OBU identifier OID may optionally also be transmitted in the position notifications $pos_i$ and then assigned identically in the transaction server 14 to the position data log 42. The position data log 42 can then be used to produce "GNSS-based" toll transactions TR in the transaction server 14, or already contains these toll transactions directly (when the position notifications $pos_i$ were "finished" toll transactions TR).

In the further phases $b_2$ and $b_4$ of the method illustrated by way of example, the MF OBU 6, over the journey thereof, now encounters further toll beacons 7 whilst in GNSS toll mode (b), here by way of example the toll beacons $RSE_n$ and $RSE_{n+1}$, which are used as follows to check the GNSS-based toll transactions TR.

When an MF OBU 6 when passing a toll beacon 7 is requested to respond (step 31), it then answers in the phases $b_2$ and $b_4$ not only with its OBU identifier OID, but also with its current session identifier SID (step 43). The toll beacon 7 now knows that GNSS billing is running "in the background" via the GNSS part 3 (sessions 38, 39, 41), and now responds differently compared with phases $a_1$ and $a_2$, where it had not obtained a session identifier SID: It now transmits back its own beacon identifier $BID_n$ in the next step 44 to the matching MF OBU 6, which collects the beacon identifiers $BID_n$ thus received of all beacon passes in a first beacon log BIDLog1(SID) 45. Alternatively or additionally, in a step 46, the toll beacon 7 can transmit the OBU identifier OID and/or the session identifier SID of the passing MF OBU 6 together with the beacon identifier $BID_n$ thereof to the transaction server 14, which collects this information in a second beacon log BIDLog2(SID) 47.

In addition, the toll beacon 7 records a feature of the vehicle 5 using the detector 10, for example an image $PIC_n$ of the vehicle 5, and stores this in the memory 13 of the toll beacon 7 under the session identifier SID, optionally in a form encrypted with the aid of the session identifier SID. The detector 10 of the toll beacon 7 can record any arbitrary characteristic feature of a vehicle 5, for example the outer form or a part thereof, such as vehicle body, axle number, size, width and/or height, the weight of the vehicle, vehicle registration, for example an image of the registration plate of the vehicle 5, on which the vehicle registration can be read by means of optical image recognition methods (optical character recognition or OCR), etc. In this sense, the detector 10 may be, for example, a laser scanner or radar scanner scanning the form of the vehicle, one or more light barriers, a weight sensor and/or a digital camera or video camera.

The beacon identifiers $BID_n$ of all toll beacons 7 passed by the vehicle 5 during the GNSS billing phase (b) are thus collected in the first beacon log BIDLog1(SID) 45 of the MF OBU 6 and/or in the second beacon log BIDLog2(SID) 47 of the transaction server 14; the passed toll beacons 7 simultaneously produce recordings $PIC_n$ of features of the passing vehicles 5.

Figure 3B:
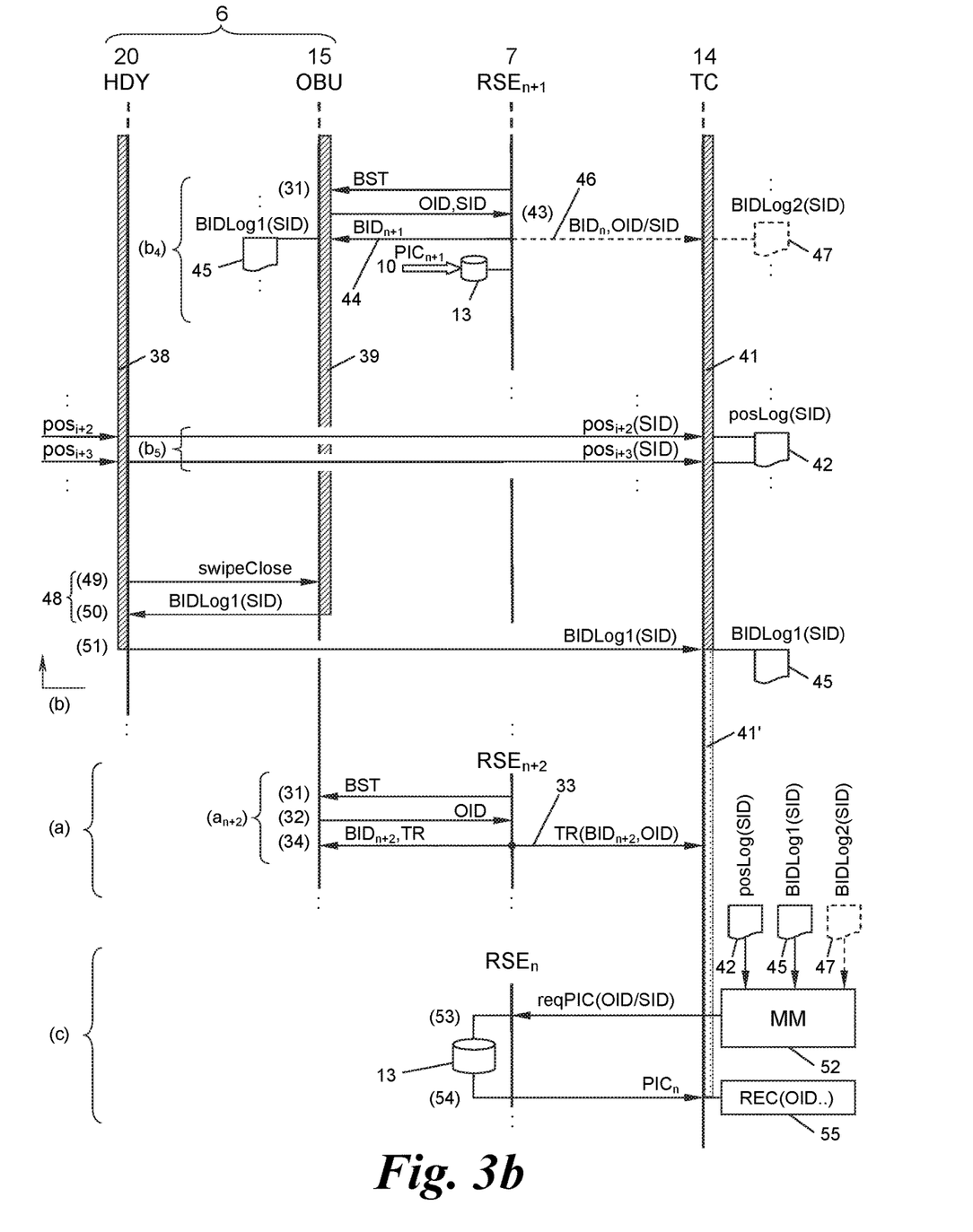
Figure 4:
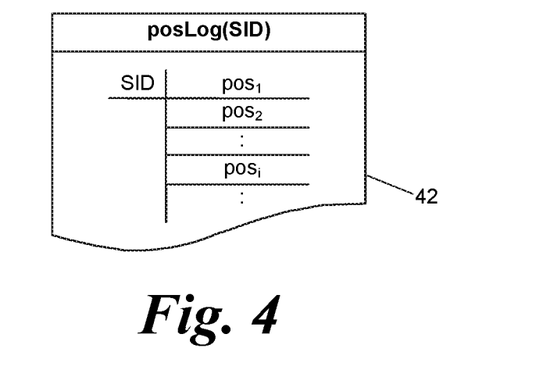
FIGS. 4 to 6 show position data logs and beacon logs occurring in the method of FIGS. 3a and 3b.
Figure 5:
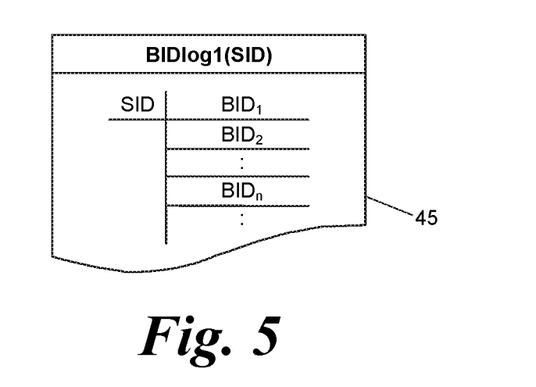
Figure 6:
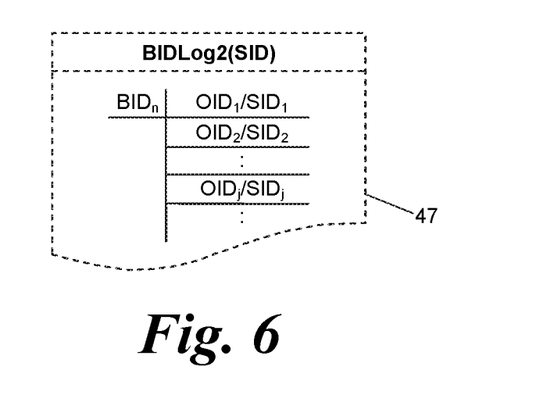

For the termination of the GNSS billing phase (b), the user now establishes a second temporary NFC connection 48 via the NFC interface 27, for example by a renewed swiping of the mobile phone 20 over the OBU 15 (step 49). The OBU 15 now transmits the accumulated first beacon log BIDLog1 (SID) 45 to the mobile phone 20 (step 50) and terminates or concludes the session 39. The mobile phone 20 transmits the obtained first beacon log BIDLog1(SID) 45 in step 51 via the mobile network 18 to the transaction server 14 and likewise terminates a session 38. The session 41 running under the session identifier SID can now also be terminated in the transaction server 14; the session identifier SID is also stored where necessary (see process 41'), as will be described later.

The first beacon log BIDLog1(SID) 45 can be encrypted in the OBU 15 cryptographically before it is transmitted in step 50 to the mobile phone 20 in order to prevent the mobile phone 20, an application therein or the user from reading or manipulating the data in the beacon log 45. By way of example, the first beacon log 45 can also be provided for this purpose with a cryptographic signature and/or a checksum (hash value), which can then be checked in the transaction server 14 for authenticity and/or integrity. The encryption of the first beacon log 45 can be performed for example with the aid of a public/private key method, of which the private key is used in the OBU 15 for encryption and of which the public key is used in the transaction server 14 for decryption.

Following termination of the GNSS billing phase (b), the MF OBU 6 and then the beacons 7 passed thereby revert back to the DSRC billing mode (a); see the exemplary beacon pass $a_{n+2}$ with steps 31 to 34.

In a subsequent validation phase (c) of the method, the transaction server 14 now has both the toll transactions TR produced or caused by an MF OBU 6 in the GNSS billing phase (b) in the form of the position data log posLog(SID) 42, whether this contains "raw" position data $p_i$ or "finished" toll transactions TR, and also the first beacon log BIDLog1 (SID) 45, which was collected by the MF OBU 6 in this phase on the basis of the beacon passes $b_3$, $b_4$. In a validation or double-checking step 52, the toll transactions TR or posLog(SID) produced for a session identifier SID can thus be double-checked against or compared with the first beacon log BIDLog1(SID) 45 received under the same session identifier SID in order to detect mismatches. Such a mismatch may be caused for example by the fact that the journey of the vehicle 5 specified by the position data log posLog(SID) 42 or the toll transactions TR based thereon or contained therein does not match with the locations $P_n$ of the toll beacons 7 specified in the first beacon log BIDLog1 (SID) or vice versa. For example, this indicates a malfunction of the road toll system 1 or fraudulent manipulation at the MF OBU 6.

Alternatively or additionally, a further double check can be performed with the MF OBU passes signalled by the toll beacons 7, these passes being collected with reference to the respective session identifier SID in the form of the second beacon log BIDLog2(SID) 47. The second beacon log BIDLog2(SID) 47 can be double-checked here against the first beacon log BIDLog1(SID) 45 and/or the position data log posLog(SID) 42 or the toll transactions TR.

The double check step 42 can be, for example a map matching between the journeys of the vehicle 5 in the toll road system 1 indicated by the various logs 42, 45, 47 with the previously known locations $P_n$ of the toll beacons 7 or $RSE_n$, for example with the aid of digital road maps, which contain possible journeys for vehicles 5 and the locations $P_n$ of the toll beacons 7.

It goes without saying that the beacon logs 45, 47 may also each contain only compressed details of the passed toll beacons 7, for example a hash value of the beacon identifiers $BID_n$, of the passed toll beacons 7. The transaction server 14 can then calculate a comparison hash value from the beacon identifiers $BID_n$ known thereto of those toll beacons 7 that must have been passed by the multi-functional OBU 6 on the journey thereof specified in accordance with the position data posLog(SID) 42 and can then compare this value with the hash value(s) specified in the beacon log(s) 45, 47 in order to detect mismatches. Such compressed (hashed) beacon logs 45, 47, which no longer contain the beacon identifiers $BID_n$ in plain text, but for example only still in the form of a hash value or a checksum, also fall within the term "beacon log" used here.

In the case of a mismatch, the transaction server 14 may request from the corresponding toll beacon 7 or $RSE_n$, in a (optional) step 53, the vehicle feature $PIC_n$ recorded in said toll beacon in the memory 13 under the session identifier SID, for example an image of the vehicle 5, and may recover this (step 54). If the vehicle feature $PIC_n$ has been encrypted with the session identifier SID, the session identifier SID is to be stored up until this moment in the transaction server 14 (see process 41') in order to be used for decryption of the vehicle feature $PIC_n$. Session identifiers SID for toll transactions TR, which were found to be in order in step 52, can be deleted (even as early as step 52) in order to prevent a further decryption of the stored vehicle features $PIC_n$ of "correct" vehicles.

In a step 55, an enforcement dataset REC is produced, which contains the detected mismatch in conjunction with the determined vehicle feature $PIC_n$ and also the session identifier SID and/or the OBU identifier OID (when the latter is also transmitted and has been assigned the session identifier SID). If the OBU identifier OID in the transaction server 14 is not available at this point, the enforcement dataset REC may also contain just the session identifier SID.

It goes without saying that an MF OBU 6, which transmits position notifications $pos_i$ to the transaction server 14 via the mobile network 18 in the GNSS billing phase (b), can also transmit in each case a subscriber identifier TID of the mobile phone 20 in the mobile network 18, for example an IMSI (international mobile subscriber identification), TIMSI (temporary international mobile subscriber identification, IMEI (international mobile equipment identifier) or the like, on the basis of which a GNSS-based toll transaction TR can be attributed to a billing account in the mobile network 18. For exclusively GNSS-based toll transactions TR, the assignment of the session identifier SID and/or the OBU identifier OID to the subscriber identifier TID therefore is not absolutely necessary, but is optional.

In an embodiment, a method for checking toll transactions, produced from position notifications of a mobile phone connected via a mobile network to a transaction server, with the aid of a network of distributed toll beacons, which can communicate via short-range radio with on-board units of passing vehicles and are connected to the transaction server, is described. The method includes: carrying a mobile phone and an on-board unit on a vehicle; generating a session identifier, exchanging the session identifier between the mobile phone and the on-board unit and transmitting the session identifier to the transaction server; producing position notifications in the mobile phone and sending the position notifications under the session identifier to the transaction server in order to produce toll transactions; when the on-board unit passes a toll beacon, logging the pass in a beacon log under the session identifier; and double-checking the toll transactions produced for the session identifier with the beacon log created for the session identifier.

In an embodiment of the method, as a toll beacon is passed a beacon identifier is transmitted from the toll beacon to the on-board unit and is stored in a first beacon log in the on-board unit; and the first beacon log is transmitted with the session identifier via the mobile phone to the transaction server in order to be double-checked.

In an embodiment of the method, as a toll beacon is passed the session identifier is transmitted from the on-board unit to the toll beacon and from there is transmitted with a beacon identifier to the transaction server; and all beacon identifiers received under the session identifier are stored in the transaction server in a second beacon log.

In an embodiment of the method, as a toll beacon is passed the session identifier is transmitted from the on-board unit to the toll beacon and from there is transmitted with a beacon identifier to the transaction server; all beacon identifiers received under the session identifier are stored in the transaction server in a second beacon log; and the second beacon log is also double-checked against the first beacon log during the double check.

In an embodiment of the method, the method comprises: when passing the toll beacon: recording a vehicle feature using a detector of the toll beacon and storing the vehicle feature under the session identifier in the toll beacon; and when the double check in the transaction server indicates a mismatch, transmitting the stored vehicle feature from the toll beacon to the transaction server.

In an embodiment of the method, the vehicle feature is stored in an encrypted manner with the aid of the session identifier.

In an embodiment of the method, the double check is performed by means of map matching between geographical positions of toll beacons stored in the beacon log on the basis of the beacon identifiers thereof and the position notifications.

In an embodiment of the method, the generation of the session identifier and the transmission of the first beacon log is initiated in each case by a temporary near-range or NFC (near field communication) connection between the mobile phone and on-board unit.

In an embodiment of the method, the first beacon log is encrypted cryptographically in the on-board unit and is transmitted in this form to the mobile phone.

In an embodiment of the method, an on-board unit identifier of the on-board unit is in each case also transmitted with the session identifier.

In another embodiment, a vehicle-based arrangement is described. The vehicle-based arrangement includes: a mobile phone with a satellite receiver for position determination and a mobile communications module for position notification via a mobile network to a transaction server; and an on-board unit with a short-range transceiver for radio communication with a toll beacon, wherein the mobile phone and the on-board unit are configured to exchange a session identifier via a common radio interface, which session identifier is used by the mobile phone in a position notification via the mobile network and is used by the on-board unit in a radio communication with a toll beacon.

In an embodiment of the vehicle-based arrangement, the radio interface is an NFC interface for temporary NFC connections.

In an embodiment of the vehicle-based arrangement, the on-board unit is configured to receive a beacon identifier from a toll beacon and to store said beacon identifier in a first beacon log.

In an embodiment of the vehicle-based arrangement, the on-board unit is configured to transmit the first beacon log via the common radio interface to the mobile phone, and the mobile phone is designed to transmit a received first beacon log via the mobile network to the transaction server.

In a further embodiment, a toll beacon is described. The toll beacon includes a short-range transceiver for radio communication with a passing on-board unit of a vehicle, an interface to a transaction server, and a processor with memory for controlling the transceiver and the interface, wherein the processor is configured to receive a session identifier from a passing on-board unit and to transmit said session identifier together with a beacon identifier to the transaction server.

In an embodiment of the toll beacon, the processor is also configured to transmit the beacon identifier from the toll beacon to the on-board unit.

In an embodiment of the toll beacon, the toll beacon further comprises a detector for recording a feature of the vehicle, wherein the processor is configured to record a vehicle feature using the detector and to store the vehicle feature under the session identifier in the toll beacon and, upon a request received from the transaction server, to transmit the stored vehicle feature to the transaction server.

In an embodiment of the toll beacon, the detector is a camera and the vehicle feature is a feature of an external appearance of the vehicle.

In yet another embodiment, a transaction server is described. The transaction server includes a first interface to a mobile network and a second interface to a network of geographically distributed toll beacons, wherein the transaction server is configured to double-check position notifications of a mobile phone received via the first interface with beacon logs received via at least one of the first interface or the second interface, wherein toll beacons passed by the mobile phone are specified in said beacon logs.

In an embodiment of the transaction server, the transaction server is configured to request via the second interface a vehicle feature stored in a toll beacon in the case of a mismatch occurring during the double check.

CONCLUSION

The invention is not limited to the presented embodiments, but also comprises all variants and modifications that fall within the scope of the accompanying claims.

What is claimed is:

1. A transaction server of a road toll system, comprising a first interface to a mobile network and a second interface to a network of geographically distributed toll beacons, wherein the transaction server is configured to:
   receive a session identifier which is unique in the road toll system from a mobile phone carried on a vehicle, the session identifier being generated by one of the mobile phone or an on-board unit carried on said vehicle, and the session identifier being exchanged between the mobile phone and the on-board unit;
   receive, from a first session for communication identified by said session identifier within said mobile phone, position notifications of the mobile phone via the first interface under said session identifier;
   receive, from a second session for communication identified by said session identifier within said on-board unit, at least one of:
      a first beacon log from the mobile phone via the first interface under said session identifier; or
      a second beacon log from said network of toll beacons via the second interface under said session identifier, wherein toll beacons passed by the mobile phone are specified in said at least one of the first beacon log or the second beacon log; and
   double-check said position notifications with said at least one of the first beacon log or the second beacon log.

2. The transaction server according to claim 1, wherein the transaction server is configured to request via the second interface a vehicle feature stored in a toll beacon in the case of a mismatch occurring during the double check.

3. The transaction server according to claim 1, wherein at least one of the first beacon log or the second beacon log stores beacon identifiers.

4. The transaction server according to claim 3, wherein the double-check is performed by means of map matching between geographical positions of the toll beacons stored in the at least one of the first beacon log or the second beacon log on the basis of the beacon identifiers thereof and position notifications of the mobile phone.

5. The transaction server according to claim 1, wherein at least one of the first beacon log or the second beacon log is encrypted cryptographically.

6. The transaction server according to claim 1, wherein at least one of the first beacon log or the second beacon log stores hash values of the beacon identifiers.

7. The transaction server according to claim 6, wherein the transaction server is configured to calculate a comparison hash value and compare the comparison hash value to the hash values stored in at least one of the first beacon log or the second beacon log to determine mismatches.

8. The transaction server according to claim 7, wherein the transaction server is configured to delete the session identifier if no mismatch is determined.

9. A method performed by a transaction server of a road toll system, comprising a first interface to a mobile network and a second interface to a network of geographically distributed toll beacons, comprising:
  receiving a session identifier which is unique in the road toll system from a mobile phone carried on a vehicle, the session identifier being generated by one of the mobile phone or an on-board unit carried on said vehicle and the session identifier being exchanged between the mobile phone and the on-board unit;
  receiving, from a first session for communication identified by said session identifier within said mobile phone, position notifications of the mobile phone via the first interface under said session identifier;
  receiving, from a second session for communication identified by said session identifier within said on-board unit, at least one of:
    a first beacon log from the mobile phone via the first interface under said session identifier; or
    a second beacon log from said network of toll beacons via the second interface under said session identifier, wherein toll beacons passed by the mobile phone are specified in said at least one of the first beacon log or the second beacon log; and
  double-checking said position notifications with said at least one of the first beacon log or the second beacon log.

10. The method according to claim 9, further comprising:
  requesting, via the second interface, a vehicle feature stored in a toll beacon in the case of a mismatch occurring during the double check.

11. The method according to claim 9, wherein at least one of the first beacon log or the second beacon log stores beacon identifiers.

12. The method according to claim 11, wherein said double-checking is performed by means of map matching between geographical positions of the toll beacons stored in the at least one of the first beacon log or the second beacon log on the basis of the beacon identifiers thereof and position notifications of the mobile phone.

13. The method according to claim 9, wherein the at least one of the first beacon log or the second beacon log is encrypted cryptographically.

14. The method according to claim 9, wherein the at least one of the first beacon log or the second beacon log stores hash values of the beacon identifiers.

15. The method according to claim 14, further comprising:
  calculating a comparison hash value; and
  comparing the comparison hash value to the hash values stored in the at least one of the first beacon log or the second beacon log to determine mismatches.

16. The method according to claim 15, further comprising:
  deleting the session identifier if no mismatch is determined.

* * * * *